(12) United States Patent
Suen et al.

(10) Patent No.: US 11,692,060 B2
(45) Date of Patent: Jul. 4, 2023

(54) SILANE MODIFIED POLYMERS WITH IMPROVED PROPERTIES

(71) Applicants: Henkel IP & Holding GmbH, Duesseldorf (DE); Henkel AG & Co. KGaA, Duesseldorf (DE)

(72) Inventors: Wu Suen, Pennington, NJ (US); Andrea Keys Eodice, Hillsborough, NJ (US); Claudia Meckel-Jonas, Duesseldorf (DE); Johann Klein, Duesseldorf (DE)

(73) Assignees: Henkel IP & Holding GmbH, Duesseldorf (DE); Henkel AG & Co. KGaA, Duesseldorf (DE)

(*) Notice: Subject to any disclaimer, the term of this patent is extended or adjusted under 35 U.S.C. 154(b) by 0 days.

(21) Appl. No.: 16/663,478

(22) Filed: Oct. 25, 2019

(65) Prior Publication Data
US 2020/0055984 A1 Feb. 20, 2020

Related U.S. Application Data

(63) Continuation of application No. PCT/US2018/029546, filed on Apr. 26, 2018.

(60) Provisional application No. 62/657,135, filed on Apr. 13, 2018, provisional application No. 62/490,091, filed on Apr. 26, 2017.

(51) Int. Cl.
| | |
|---|---|
| C08J 3/24 | (2006.01) |
| C08G 65/336 | (2006.01) |
| C09J 5/00 | (2006.01) |
| C09J 171/02 | (2006.01) |
| C09K 3/10 | (2006.01) |

(52) U.S. Cl.
CPC ............ C08G 65/336 (2013.01); C08J 3/24 (2013.01); C09J 5/00 (2013.01); C09J 171/02 (2013.01); C09K 3/10 (2013.01); C09J 2467/00 (2013.01); C09K 2003/1056 (2013.01); C09K 2200/0662 (2013.01)

(58) Field of Classification Search
CPC ................ C08J 3/23; C08G 65/336
See application file for complete search history.

(56) References Cited

U.S. PATENT DOCUMENTS

| | | | |
|---|---|---|---|
| 3,632,557 A | 1/1972 | Brode et al. | |
| 3,971,751 A | 7/1976 | Isayama et al. | |
| 3,979,344 A | 9/1976 | Bryant et al. | |
| 4,960,844 A | 10/1990 | Singh | |
| 5,225,512 A | 7/1993 | Baghdachi et al. | |
| 5,990,257 A | 11/1999 | Johnston et al. | |
| 6,124,387 A | 9/2000 | Wang et al. | |
| 6,197,912 B1 | 3/2001 | Huang et al. | |
| 6,924,321 B2 | 8/2005 | Casati et al. | |
| 7,307,134 B2 | 12/2007 | Lim et al. | |
| 7,557,173 B2 | 7/2009 | Bachon et al. | |
| 8,450,411 B2 | 5/2013 | Zander et al. | |
| 8,772,421 B2 | 7/2014 | Bachon et al. | |
| 9,365,751 B2 | 6/2016 | Suen | |
| 10,301,422 B2 | 5/2019 | Kramer et al. | |
| 10,407,533 B2 | 9/2019 | Kramer et al. | |
| 2004/0127671 A1* | 7/2004 | Roesler | C08G 18/3821 528/38 |
| 2005/0215701 A1* | 9/2005 | Porsch | C08G 18/718 524/589 |
| 2007/0129528 A1 | 6/2007 | Huang et al. | |
| 2009/0030145 A1* | 1/2009 | Johnston | C08G 18/718 524/590 |
| 2011/0118432 A1 | 5/2011 | Zhao et al. | |
| 2012/0273731 A1 | 11/2012 | Moralez et al. | |
| 2013/0102738 A1 | 4/2013 | Stanjek et al. | |
| 2014/0155545 A1 | 6/2014 | Stanjek et al. | |
| 2016/0152752 A1 | 6/2016 | Klemarczyk et al. | |
| 2016/0160103 A1* | 6/2016 | Stanjek | C08G 18/283 528/38 |
| 2018/0002491 A1* | 1/2018 | Peeters | C08K 5/29 |

FOREIGN PATENT DOCUMENTS

| | | |
|---|---|---|
| EP | 0370464 A2 | 5/1990 |
| EP | 0397036 A2 | 11/1990 |
| EP | 0601021 A1 | 6/1994 |
| EP | 0931800 A1 | 7/1999 |
| EP | 3 067 375 * | 9/2016 |
| WO | 2008077045 A2 | 6/2008 |
| WO | 2015020692 A1 | 2/2015 |
| WO | 2016083309 A1 | 6/2016 |
| WO | 2016083312 A1 | 6/2016 |

(Continued)

OTHER PUBLICATIONS

Michel J. Owen, "Coupling agents: chemical bonding at interfaces", in Adhesion Science and Engineering-2, Surfaces, Chemistry and Applications, M. Chaudhury and A. V. Pocius eds., Elsevier, New York, 2002, p. 403.
International Search Report for International PCT Patent Application No. PCT/US2018/029546 dated Aug. 2, 2018.
International Search Report for International PCT Patent Application No. PCT/US2018/030601 dated Aug. 9, 2018.

(Continued)

Primary Examiner — Margaret G Moore
(74) Attorney, Agent, or Firm — James E. Piotrowski

(57) ABSTRACT

The disclosure relates to moisture curable compositions based on a combination of silane-modified polymer and silane functional additive, their manufacture and use. The silane functional additive is preferably prepared from a water miscible polyol having a functionality of about 2 to about 4 and/or a polyol having a tertiary nitrogen atom in the backbone and a functionality equal or greater than about 2.

14 Claims, 1 Drawing Sheet

(56) References Cited

FOREIGN PATENT DOCUMENTS

WO      2016105915 A1    6/2016
WO      2016/114376    *   7/2016

OTHER PUBLICATIONS

Casati et al., "Influence of Non-Fugitive Catalysis on Physical Characteristics of Automotive Polyurethane Molded Foam," The Dow Chemical Company, 13 pages.
European Search Report for EP Patent Application No. 18 79 1856 dated Aug. 13, 2020.

* cited by examiner

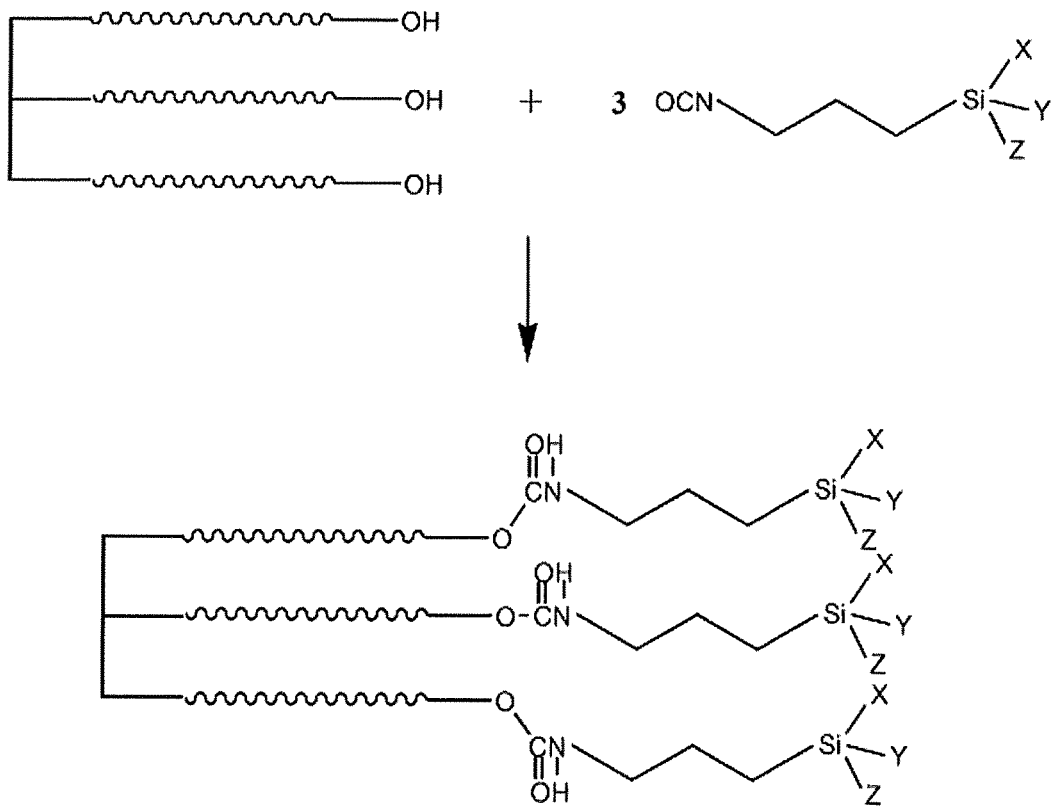
where X, Y, Z are, independently of one another, selected from the group consisting of a hydroxyl group, a $C_1$ to $C_8$ alkyl, $C_1$ to $C_8$ alkoxy group or a $C_1$ to $C_8$ acyloxy group and at least one of X, Y or Z is the alkoxy group

SILANE MODIFIED POLYMERS WITH IMPROVED PROPERTIES

FIELD

The disclosure relates to curable compositions based on a combination of silane-modified polymer and silane functional additive, their manufacture and use.

BRIEF DESCRIPTION OF RELATED TECHNOLOGY

One-component, moisture-curing adhesives and sealants have for years played a significant role in numerous technical applications. In addition to the polyurethane adhesives and sealants having free isocyanate groups and the traditional silicone resin adhesives and sealants based on dimethylpolysiloxane backbone structures, the silane terminated polymers have also been increasingly used recently. Adhesives and sealants based on silane terminated polymers have the advantage, as compared with the polyurethane adhesives and sealants, of being free of isocyanate groups, in particular of monomeric diisocyanates; they are also notable for a broad adhesion spectrum to a plurality of substrates without surface pretreatment using primers.

Silane terminated polymers are polymer systems comprising an organic polymer backbone, for example polyurethane or polyether and reactive and crosslinkable silyl alkoxy groups. Silane terminated polymers are different from silicone resins in that they do not have siloxane (—Si—O—Si—) linkages in the backbone. In the presence of atmospheric moisture these silyl alkoxy terminated polymers are capable, at room temperature, of crosslinking and curing to form, depending on the concentration of alkoxysilyl groups and their configuration, long-chain polymers (thermoplastics), relatively wide-mesh three-dimensional networks (elastomers), or highly crosslinked systems (thermosets).

Methods for the manufacture of some silane-terminated polymers are described in U.S. Pat. No. 3,971,751 A, EP-A-70475, U.S. Pat. Nos. 6,124,387 A, 5,990,257 A, 4,960,844 A, 3,979,344 A, 3,632,557 A, 7,307,134, 8,772,421, EP-A-601021, EP-A-370464, EP-A-397 036, EP-A-0931800, EP-A-153940.

Silane terminated polymers when cured have acceptable strength for many bonding applications. However, there is a continued demand for adhesives and sealants based silane terminated polymers that have an even higher strength when cured. However, increasing the strength of a cured composition typically results in decreasing the flexibility and elongation of that cured composition. It would be desirable to provide adhesives and sealants based silane terminated polymers that have both increased strength and increased flexibility when cured.

SUMMARY

One embodiment is a moisture curable composition comprising a silane modified polymer and a silane functional additive. In one variation the silane functional additive advantageously comprises a linear backbone, i.e. no pendant atoms except H are bonded to the backbone atoms. In another variation the silane functional additive is the reaction product of an isocyanatosilane and a polyol having linear polyethylene oxide backbone and linear polyethylene oxide pendant segments. Advantageously the polyol has an OH functionality of about 2 to about 4. Advantageously, the polyol has good water miscibility. In all these embodiments the silane modified polymer and the silane functional additive are structurally different.

Another embodiment comprises a moisture curable composition comprising a silane modified polymer and a silane functional additive with electron negative heteroatom in the molecule. In one variation the silane functional additive is the reaction product of an amino silane and an isocyanate functional oligomer having a functionality (f) equal to or greater than 2. In all these embodiments the silane modified polymer and the silane functional additive are structurally different.

Adding the silane functional additive with these structures to a moisture curable silane modified polymer composition provides cured reaction products of that moisture curable composition with the combination of both improved tensile strength and increased elongation as compared to either a moisture curable composition made using silane modified polymer alone or a moisture curable composition made using silane modified polymer and a different additive. This is surprising as additives that improve cured strength of reaction products of a moisture curable silane modified polymer composition typically result in decreased elongation and elasticity of those reaction products. This is also surprising as additives that improve elongation and elasticity of reaction products of a moisture curable silane modified polymer composition typically result in decreased cured strength of those reaction products.

The moisture curable compositions of this disclosure require little or no metal catalyst to achieve a desired state of cure and attendant physical properties for the cured composition. This allows reducing or eliminating metal catalyst, for example organotin catalyst, which lessens environmental hazard.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

BRIEF DESCRIPTION OF THE FIGURES

FIG. 1 is a representation of one reaction scheme for making the disclosed silane functional additive.

DETAILED DESCRIPTION

As used herein for each of the various embodiments, the following definitions apply:

Unless otherwise specifically defined, "acyloxy" refers to the general formula —O—CO-alkyl.

Unless otherwise specifically defined, "alkoxy" refers to the general formula —O— alkyl.

Unless otherwise specifically defined, "alkyl" refers to a linear, branched or cyclic alkyl group having from 1 to about 9 carbon atoms including, for example, methyl, ethyl, propyl, butyl, hexyl, octyl, isopropyl, isobutyl, tert-butyl, cyclopropyl, cyclohexyl, cyclooctyl, vinyl and allyl. Unless otherwise specifically defined, an alkyl group can be substituted or unsubstituted.

Unless otherwise specifically defined, "composition" refers to a mixture of at least two ingredients.

Unless otherwise specifically defined, "curable" means that, under the influence of external conditions, in particular under the influence of moisture present in the environment and/or supplied for the purpose, the composition can pass from a relatively flexible state, optionally possessing plastic ductility, to a harder state. In general, the crosslinking can take place by means of chemical and/or physical influences, i.e. as well as the already mentioned moisture, for example, by the supply of energy in the form of heat, light or other electromagnetic radiation, but also by simply bringing the composition into contact with air or a reactive component.

Unless otherwise specifically defined, "polyether" means a polymer in which the organic repeating units comprise ether functionalities C—O—C in the main chain. Polymers having lateral ether groups, such as cellulose ethers, starch ethers and vinyl ether polymers, as well as polyacetals such as polyoxymethylene (POM) are not included in the polyethers.

Unless otherwise specifically defined, "polyisocyanate" means a compound which has at least two isocyanate groups —NCO. This compound may, but does not have to, be a polymer, and instead is frequently a low molecular compound.

Unless otherwise specifically defined, "poly(meth)acrylic acid ester" means a polymer based on (meth)acrylic acid esters, which therefore has as a repeating unit the structural motif —$CH_2$—$CR^a(COOR^b)$—, where $R^a$ denotes a hydrogen atom (acrylic acid ester) or a methyl group (methacrylic acid ester) and $R^b$ denotes linear alkyl residues, branched alkyl residues, cyclic alkyl residues and/or alkyl residues comprising functional substituents, for example methyl, ethyl, isopropyl, cyclohexyl, 2-ethylhexyl or 2-hydroxyethyl residues.

Unless otherwise specifically defined, "polyol" means a compound which contains at least two OH groups, irrespective of whether the compound contains other functional groups. However, a polyol used in accordance with the present invention preferably contains only OH groups as functional groups or, if other functional groups are present, none of these other functional groups is reactive at least to isocyanates under the conditions prevailing during the reaction of the polyol(s) and polyisocyanate(s).

Unless otherwise specifically defined, "polyurethane" means a polymer which has at least two urethane groups —NH—CO—O— in the main chain.

Unless otherwise specifically limited the term substituted means substituted by at least one below described substituent group in any possible position or positions. Substituent groups for the above moieties useful in the disclosed compounds are those groups that do not significantly diminish the desired effect of the disclosed compound. Substituent groups that do not significantly diminish the activity of the disclosed compound include, for example, H, halogen, alkyl, alcohol and alkoxy. Unless otherwise specifically limited, a substituent group may be in any possible position or any possible positions if multiply substituted.

The disclosed curable compositions comprise silane modified polymer, silane functional additive and optionally one or more additives. Silane modified polymer and silane functional additive have different chemical structures. In the presence of moisture from the air or water the silane modified polymer, which possess a plurality of hydrolysable silyl alkoxy groups, are capable of crosslinking at room temperature to an irreversible cured state.

In one embodiment the silane modified polymer preferably has the structure shown in general Formula I

B is an organic backbone. B will not be a siloxane backbone. B can be selected from polyurethane, polyether, polyester, poly(meth)acrylic acid ester, polyacrylamide, polymethacrylamide, polyvinyl ester, polyolefin, alkyd resin, phenol resin, vinyl polymer, styrene-butadiene copolymer, as well as copolymers of one or more of the above backbones. Important properties of silane modified polymer and the curable composition, such as e.g. viscosity and elasticity, but also environmental resistance, can be influenced by the choice and the specific physical form of the polymer classes used for the backbone.

Polyurethanes, polyethers and polyesters, especially polyurethanes and polyethers, are preferably employed for the B backbone structure. Polyethers that are based on polyethylene oxide and/or polypropylene oxide are particularly preferably employed due to considerations of availability and due to their excellent elastic properties.

B is particularly preferably a polyether. Polyethers have a flexible and elastic structure, with which compositions having excellent elastic properties can be produced. Polyethers are not only flexible in their backbone, but at the same time strong. Thus, for example, polyethers are not attacked or decomposed by water and bacteria, in contrast to, e.g., polyesters, for example.

The number average molecular weight $M_n$ of the polyether on which the B backbone is based preferably 2000 to 100,000 g/mol (daltons), particularly preferably at least 6000 g/mol and in particular at least 8000 g/mol. Number average molecular weights of at least 2000 g/mol are advantageous for the polyethers of the present invention, because compositions based on polyethers with such a minimum molecular weight have significant film-forming properties. For example, the number average molecular weight $M_n$ of the polyether is 4000 to 100,000, preferably 8000 to 50,000, particularly preferably 10,000 to 30,000 and in particular 10,000 to 25,000 g/mol. These molecular weights are particularly advantageous, since the corresponding compositions have a balanced ratio of viscosity (ease of processing), strength and elasticity.

Particularly advantageous viscoelastic properties can be achieved if polyethers having a narrow molecular weight distribution, and thus low polydispersity, are used. These can be produced, for example, by so-called double metal cyanide catalysis (DMC catalysis). Polyethers produced in this way are distinguished by a particularly narrow molecular weight distribution, by a high average molecular weight and by a very low number of double bonds at the ends of the polymer chains.

In a special embodiment of the present invention, the maximum polydispersity $M_w/M_n$ of the polyether on which the polymer is based is therefore 3, particularly preferably 1.7 and most particularly preferably 1.5.

The number average molecular weight $M_n$, as well as the weight average molecular weight $M_w$, is determined according to the present invention by gel permeation chromatography (GPC, also known as SEC) at 23° C. using a styrene standard. This method is known to one skilled in the art. The polydispersity is derived from the average molecular weights $M_w$ and $M_n$. It is calculated as $PD=M_w/M_n$.

The ratio $M_w/M_n$ (polydispersity) indicates the width of the molecular weight distribution and thus of the different degrees of polymerization of the individual chains in polydisperse polymers. For many polymers and polycondensates, a polydispersity value of about 2 applies. Strict monodispersity would exist at a value of 1. A low polydispersity of, for example, less than 1.5 indicates a comparatively narrow molecular weight distribution, and thus the specific expression of properties associated with molecular weight, such as e.g., viscosity. In particular, therefore, in the context of the present invention, the polyether on which the polymer A is based has a polydispersity ($M_w/M_n$) of less than 1.3.

In preferred embodiments B can be a polyurethane obtainable by reacting at least i) a polyol or a mixture of two or more polyols and ii) a polyisocyanate or a mixture of two or more polyisocyanates.

The polyols suitable for preparing the polyurethane B backbone are preferably polyether polyol. The above descriptions about the molecular weight and polydispersity of the polyether apply to the polyether polyol. The polyether polyol is preferably a polyalkylene oxide, particularly preferably polyethylene oxide and/or polypropylene oxide. In preferred embodiments, a polyether or a mixture of two polyethers are used.

The polyols to be used in accordance with the invention have an OH value of preferably about 5 to about 15 and, more preferably, of about 10. The percentage content of primary OH groups should be below about 20%, based on all the OH groups, and is preferably below 15%. In one particularly advantageous embodiment, the acid value of the polyethers used is below about 0.1, preferably below 0.05 and, more preferably, below 0.02.

Besides the polyethers, the polyol mixture may contain other polyols. For example, it may contain polyester polyols with a molecular weight of about 200 to about 30,000.

The polyisocyanates suitable for preparing the polyurethane B backbone include ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI), and the isomeric mixtures thereof. Also suitable are partially or completely hydrogenated cycloalkyl derivatives of MDI, for example completely hydrogenated MDI ($H_{12}$-MDI), alkyl-substituted diphenylmethane diisocyanates, for example mono-, di-, tri-, or tetraalkyldiphenylmethane diisocyanate and the partially or completely hydrogenated cycloalkyl derivatives thereof, 4,4'-diisocyanatophenylperfluorethane, phthalic acid-bis-isocyanatoethyl ester, 1 chloromethylphenyl-2,4- or -2,6-diisocyanate, 1-bromomethylphenyl-2,4- or -2,6-diisocyanate, 3,3'-bis-chloromethyl ether-4,4'-diphenyl diisocyanate, sulfur-containing diisocyanates such as those obtainable by reacting 2 moles diisocyanate with 1 mole thiodiglycol or dihydroxydihexyl sulfide, diisocyanates of dimer fatty acids, or mixtures of two or more of the named diisocyanates. The polyisocyanate is preferably IPDI, TDI or MDI.

Other suitable polyisocyanates are isocyanates with a functionality of three or more obtainable, for example, by oligomerization of diisocyanates, more particularly by oligomerization of the isocyanates mentioned above. Examples of such tri- and higher isocyanates are the triisocyanurates of HDI or IPDI or mixtures thereof or mixed triisocyanurates thereof and polyphenyl methylene polyisocyanate obtainable by phosgenation of aniline/formaldehyde condensates.

There is preferably a stoichiometric excess of NCO groups of the polyisocyanates with respect to the hydroxy groups of the polyols, "the polyols" and "the polyisocyanates" in each case also encompassing the presence of only one polyol and/or only one polyisocyanate. This stoichiometric excess must exist under the process conditions; i.e., it is not sufficient when the excess is nominally present, but a portion of the NCO groups of the polyisocyanates reacts with reactants other than the OH groups of the polyols, for example with monofunctional alcohols, so that there is a de facto shortage of NCO groups of the polyisocyanates with respect to the OH groups of the polyols. The ratio of the number of OH groups of the polyols to the number of NCO groups of the polyisocyanates is particularly preferably 1:3 to 1:1.1, in particular 1:2.5 to 1:1.5.

A is a divalent linking group linking the B backbone to the R group. Preferably, A comprises at least one heteroatom. For example, the divalent linking group A can be formed for example during the production of the alkoxysilane- and/or acyloxysilane-terminated polymer, for example as an amide or urethane group by the reaction of a polyether which is functionalized with hydroxy groups with an isocyanatosilane. The divalent linking group can be either capable or incapable of being differentiated from structural features occurring in the underlying polymer backbone. The latter is the case, for example, if it is identical with the linking points of the repeating units of the polymer backbone.

The divalent linking group A in the general formula (I) is preferably an oxygen atom or an —NR"— group, where R" is selected from the group consisting of a hydrogen atom, and alkyl or aryl residues having 1 to 12 carbon atoms, or is a substituted or unsubstituted amide, carbamate, urethane, urea, imino, carboxylate, carbamoyl, amidino, carbonate, sulfonate or sulfinate group. Particularly preferred as linking group A are urethane and urea groups, which can be obtained by reacting certain functional groups of a prepolymer with an organosilane which carries a further functional group. Urethane groups can be formed, for example, either when the polymer backbone comprises terminal hydroxy groups and isocyanatosilanes are used as a further component, or conversely when a polymer having terminal isocyanate groups is reacted with an alkoxysilane comprising terminal hydroxy groups. Similarly, urea groups can be obtained if a terminal primary or secondary amino group—either on the silane or on the polymer—is used, which reacts with a terminal isocyanate group that is present in the respective reactant. This means that either an aminosilane is reacted with a polymer having terminal isocyanate groups or a polymer that is terminally substituted with an amino group is reacted with an isocyanatosilane. Urethane and urea groups advantageously increase the strength of the polymer chains and of the overall crosslinked polymer.

R is a divalent hydrocarbon residue having 1 to 12 carbon atoms. The hydrocarbon residue can be a linear, branched or cyclic alkylene residue. The hydrocarbon residue can be saturated or unsaturated. The hydrocarbon residue can be substituted or unsubstituted. R is preferably a divalent hydrocarbon residue having 1 to 6 carbon atoms. The curing rate of the composition can be influenced by the length of the hydrocarbon residues which form one of the binding links or the binding link between polymer backbone and silyl residue. Particularly preferably, R is a methylene, ethylene or n-propylene group, in particular a methylene or n-propylene residue.

Silyl alkoxy terminated compounds having a methylene group as binding link to the polymer backbone—so-called "alpha-silanes"—have a particularly high reactivity of the terminating silyl group, leading to reduced setting times and thus to very rapid curing of formulations based on these polymers. In general, a lengthening of the binding hydrocarbon chain leads to reduced reactivity of the polymers. In particular, "gamma-silanes"—which comprise the unbranched propylene residue as binding link—have a balanced ratio between necessary reactivity (acceptable curing times) and delayed curing (open assembly time, possibility of corrections after bonding). By carefully combining alpha- and gamma-alkoxysilane-terminated building blocks, therefore, the curing rate of the systems can be influenced as desired. Within the context of the present invention, R is most particularly preferably an n-propylene group.

SiXYZ is a silyl alkoxy group.

The substituents X, Y and Z are, independently of one another, selected from hydrogen, a hydroxyl group, $C_1$ to $C_8$ alkyl, $C_1$ to $C_8$ alkoxy, and $C_1$ to $C_8$ acyloxy groups, wherein at least one of the substituents X, Y, Z here must be a hydrolyzable group. Preferably the hydrolysable group is a $C_1$ to $C_8$ alkoxy or a $C_1$ to $C_8$ acyloxy group. The substituents X, Y and Z are directly bound with the Si atom or the two of the substituents X, Y, Z form a ring together with the Si atom to which they are bound. In preferred embodiments, X, Y and Z are the substituents directly bound with the SI atom. As hydrolyzable groups, preferably alkoxy groups, in particular methoxy, ethoxy, i-propyloxy and i-butyloxy groups, are selected. This is advantageous, since no substances which irritate mucous membranes are released during the curing of compositions comprising alkoxy groups. The alcohols formed by hydrolysis of the residues are harmless in the quantities released and evaporate. These compositions are therefore particularly suitable for the DIY sector. However, acyloxy groups, such as an acetoxy group —O—CO—$CH_3$, can also be used as hydrolyzable groups.

In preferred embodiments, X is preferably an alkyl group and Y and Z are, each independently of one another, an alkoxy group, or X, Y and Z are, each independently of one another, an alkoxy group. In general, polymers comprising silyl di- or trialkoxy groups have highly reactive linking points which permit rapid curing, high degrees of crosslinking and thus good final strengths. The particular advantage of silyl dialkoxy groups lies in the fact that, after curing, the corresponding compositions are more elastic, softer and more flexible than systems comprising silyl trialkoxy groups. They are therefore suitable in particular for use as sealants. In addition, they split off even less alcohol during curing and are therefore of particular interest when the quantity of alcohol released is to be reduced.

With silyl trialkoxy groups, on the other hand, a higher degree of crosslinking can be achieved, which is particularly advantageous if a harder, stronger material is desired after curing. In addition, silyl trialkoxy groups are more reactive and therefore crosslink more rapidly, thus reducing the quantity of catalyst required, and they have advantages in "cold flow"—the dimensional stability of a corresponding adhesive under the influence of force and possibly temperature.

Particularly preferably, the substituents X, Y and Z in the general formula (I) are, each independently of one another, selected from a hydroxyl, a methyl, an ethyl, a methoxy or an ethoxy group, at least one of the substituents being a hydroxyl group, or a methoxy or an ethoxy group, preferably a methoxy group. Methoxy and ethoxy groups as comparatively small hydrolyzable groups with low steric bulk are very reactive and thus permit a rapid cure, even with low use of catalyst. They are therefore of particular interest for systems in which rapid curing is desirable, such as for example in adhesives with which high initial adhesion is required.

Interesting configuration possibilities are also opened up by combinations of the two groups. If, for example, methoxy is selected for X and ethoxy for Y within the same silyl alkoxy group, the desired reactivity of the terminating silyl groups can be adjusted particularly finely if silyl groups carrying exclusively methoxy groups are deemed too reactive and silyl groups carrying ethoxy groups not reactive enough for the intended use.

In addition to methoxy and ethoxy groups, it is of course also possible to use larger residues as hydrolyzable groups, which by nature exhibit lower reactivity. This is of particular interest if delayed curing is also to be achieved by means of the configuration of the alkoxy groups.

I is an integer from 1 to 6. In more preferred embodiments, I is greater than 2. Each polymer chain thus comprises at least two linking points at which the condensation of the polymers can be completed, splitting off the hydrolyzed residues in the presence of atmospheric moisture. In this way, regular and rapid crosslinkability is achieved so that bonds with good strength can be obtained. In addition, by means of the quantity and the structure of the hydrolyzable groups—for example by using silyl di- or trialkoxy groups, methoxy groups or longer residues—the configuration of the network that can be achieved as a long-chain system (thermoplastics), relatively wide-mesh three-dimensional network (elastomers) or highly crosslinked system (thermosets) can be controlled, so that inter alia the elasticity, flexibility and heat resistance of the finished crosslinked compositions can be influenced in this way.

n is 0 or 1, i.e. the divalent linking group A links the polymer backbone to the group R when n=1 or the polymer backbone is bonded or linked directly to the group R when n=0.

According to a particularly preferred embodiment silane modified polymer has a backbone B selected from polyether or polyurethane, the linking group A is a urethane or urea group, R is n-propylene, and the silane modified polymer preferably has two end groups which possess silyl di- or trimethoxy groups, for example di- or trimethoxysilylpropyl groups and di- or trimethoxysilylmethyl groups.

Molecular weight Mn of the silane modified polymer is preferably 4000 to 100,000, advantageously 6000 to 50,000, and particularly preferably 8000 to 20,000. Unless otherwise indicated molecular weight is understood to mean the number average molecular weight Mn. The molecular weights given above are particularly advantageous as the corresponding compositions possess a balanced relationship between viscosity (ease of processing), strength and elasticity.

In the context of the present invention, the ratio Mw/Mn of the silane modified polymer is preferably less than 1.7 and more preferably less than 1.5.

Polymers suitable for use as silane modified polymer are described in numerous patents and are commercially available, for example, from Momentive Performance Material under the trade name SPUR+, from Kaneka Corporation under the trade name MS polymer and SILYL polymer, from Dow Chemical under the trade name Vorasil, from Wacker Chemie under the trade name Geniosil, from Risun Polymer Inc. under the trade name Risun, and from Bayer MaterialScience under the trade name Baycoll.

In one embodiment the silane functional additive includes a backbone comprising polyethylene oxide or polytetramethylene oxide repeating groups and silylalkoxy functional groups. Advantageously, the backbone consists of polyethylene oxide repeating groups; polytetramethylene oxide repeating groups or both polyethylene oxide and polytetramethylene oxide. In this embodiment the silane functional additive can be the reaction product of an isocyanatosilane and a polyol having linear polyalkylene backbone and a functionality of 3 or more. Advantageously, the polyol has good water miscibility. This silane functional additive comprises a compound having a water miscible backbone and a plurality of silylalkoxy terminal groups linked to the backbone. Preferred silylalkoxy groups have the structure —SiXYZ wherein X, Y and Z are as described above. Preferably X, Y and Z are independently selected from hydrogen, $C_1$-$C_8$ alkyl groups, $C_1$-$C_8$ alkoxy groups, wherein at least one of the substituents X, Y, Z, and preferably at least two or all three of the substituents, must be a hydrolyzable group. Preferably the hydrolyzable group is a $C_1$ to $C_8$ alkoxy. The silylalkoxy group can be linked to the backbone by the structure -$A_n$-R— wherein A, n and R are as described above. The silane functional additive will necessarily have a different structure from the silane modified polymer.

Silane functional additive has a molecular weight Mn between about 400 and about 100,000 g/mol and preferably between 600 and 10,000 g/mol. Silane functional additives having a molecular weight below about 2,000 g/mol are desirable as they are typically liquid at room temperature and compositions comprising these silane functional additives can be pasty or semisolid and not solid at room temperature.

The structure of the water miscible polyol(s) used in this embodiment of the silane functional additive is surprisingly important. Adhesive compositions comprising silane functional additives having polyethylene oxide or polytetramethylene oxide repeating groups and silylalkoxy functional groups provide increased strength and increased flexibility compared to the same adhesive composition but using silane functional additives derived from a polyether polyol having pendant backbone groups such as a polypropylene oxide backbone. For this reason, silane functional additives having a non-linear backbone with pendant groups in the backbone, such as a polypropylene oxide backbone, are not effective and are not part of this invention. Examples of useful polyols include polyethylene glycol, polytetramethylene glycol, and some polycarbonate polyols.

The water miscible polyol used to form the silane functional additive can have a molecular weight (MW) from 400-100000 and an OH functionality of 2 or more. Preferably the water miscible polyol is poly(ethylene glycol) with a molecular weight (MW) of 600 to 2000, an OH functionality of 2 to 4 and is liquid at room temperature.

One useful water miscible polyol for this embodiment of a silane functional additive is a triol (OH functionality about 3) comprising 3 polyethylene glycol chains such as the triol shown schematically below with each chain terminated by a primary OH moiety. This polyol is available as, for example ADIANSOL GO 2280T, available from the Arkema Inc.

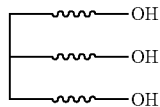

Other useful polyethylene glycols include poly(ethylene glycol) grades 250, 500, 1000, 1500, 2050, etc., from SIGMA-ALDRICH; trimethylolpropane ethoxylate (MW 170, 450, 1014) and Glycerol Ethoxylate (MW 500 and 1000) from SIGMA-ALDRICH and Adiansol TO 211, TO 230, TO 2200, available from Arkema Group. Other useful polycarbonate polyols include Eternacoll UM 90, Eternacoll UH-200 from UBE, and polycarbonate copolymer NODG-LIQ from Covestro, etc.

Useful isocyanatosilanes for reaction with the polyol with hydrophilic backbone include methyldimethoxysilylmethyl isocyanate, ethyldimethoxysilylmethyl isocyanate, methyldiethoxysilylmethyl isocyanate, ethyldiethoxysilylmethyl isocyanate, methyldimethoxysilylethyl isocyanate, ethyldimethoxysilylethyl isocyanate, methyldiethoxysilylethyl isocyanate, ethyldiethoxysilylethyl isocyanate, methyldimethoxysilylpropyl isocyanate, ethyldimethoxysilylpropyl isocyanate, methyldiethoxysilylpropyl isocyanate, ethyldiethoxysilylpropyl isocyanate, methyldimethoxysilylbutyl isocyanate, ethyldimethoxysilylbutyl isocyanate, methyldiethoxysilylbutyl isocyanate, diethylethoxysilylbutyl isocyanate, ethyldiethoxysilylbutyl isocyanate, methyldimethoxysilylpentyl isocyanate, ethyldimethoxysilylpentyl isocyanate, methyldiethoxysilylpentyl isocyanate, ethyldiethoxysilylpentyl isocyanate, methyldimethoxysilylhexyl isocyanate, ethyldimethoxysilylhexyl isocyanate, methyldiethoxysilylhexyl isocyanate, ethyldiethoxysilylhexyl isocyanate, trimethoxysilylmethyl isocyanate, triethoxysilylmethyl isocyanate, trimethoxysilylethyl isocyanate, triethoxysilylethyl isocyanate, trimethoxysilylpropyl isocyanate (e.g. GF 40, Wacker company), triethoxysilyipropyl isocyanate, trimethoxysilylbutyl isocyanate, triethoxysilylbutyl isocyanate, trimethoxysilylpentyl isocyanate, triethoxysilylpentyl isocyanate, trimethoxysilylhexyl isocyanate, triethoxysilylhexyl isocyanate and mixtures thereof. Preferred isocyanatosilanes include isocyanatopropyltrimethoxysilane and isocyanatopropyltriethoxysilane.

The silane functional additive is prepared by reacting the isocyanatosilane(s) with the selected polyol with mixing under conditions that exclude moisture. Catalysts can be used to modify reaction speed as desired. Typically, a reaction temperature in the range of 150 to 190° F. for a time of 0.5 to 1.5 hours are useful. FIG. 1 shows one scheme for this reaction. The isocyanatosilane(s) are used in an at least stoichiometric quantity with respect to the hydroxyl groups of the hydrophilic polyol, although a slight stoichiometric excess of the isocyanatosilane with respect to the hydroxyl groups of the polyol is preferred.

No catalyst is needed for effective reaction of the polyethylene glycol and isocyanatosilane. However, catalysts can optionally be useful to accelerate reaction of hydrophilic polyol(s) with isocyanotosilane(s) to form silane functional additive. Useful catalysts include organotin catalysts such as dioctyltin dilaurate (DOTL), dibutyltin dilaurate (DBTL), etc. The optional catalyst may also include other type of catalysts. Exemplary catalyst includes bismuth compounds; titanium alkoxides; tertiary amines; zirconium complexes; aluminum chelates; and other organometallic compounds based on Zn, Co, Ni, and Fe and the like. Mixtures of catalysts can be used.

The catalysts can be used in quantities from 0 to 3.0 parts by weight, based on 100 parts by weight of silane functional additive.

In another embodiment the silane functional additive comprises one or more tertiary amines in the molecule. In this embodiment the silane functional additive can be the reaction product of an isocyanate functional oligomer and a hydroxy or amino functional silyl alkoxy.

The isocyanate functional oligomer is the reaction product of a polyether polyol and a stoichiometric excess of monomeric isocyanate. Useful polyisocyanates include aromatic diisocyanates such as toluene diisocyanate (TDI), 1,4-diisocyanatobenzene (PPDI), methylenediphenyl diisocyanate (MDI) 1,5-naphthalene diisocyanate, 1,3-xylene diisocyanate, aliphatic diisocyanates such as hexamethylene diisocyanate (HDI), methylene dicyclohexyl diisocyanate or hydrogenated MDI (HMDI) and isophorone diisocyanate (IPDI) and combinations thereof. If isophorone diisocyanate (IPDI) is used the silane modified additive can have advantageous properties. Useful polyether polyols include Adiansol MA3180, Adiansol DA240 from CECA Arkema Group; Multranol M-9181, M-4050, M-8114, M-9170, M-9144 from Covestro, and combinations thereof.

The silane functional additive is prepared by reacting the polyether polyol with a stoichiometric excess of polyisocyanate with mixing under conditions that exclude moisture. Catalysts can be used to modify reaction speed as desired. Typically, a reaction temperature in the range of 150 to 190° F. for a time of 0.5 to 1.5 hours is useful. The resulting oligomer is reacted with a selected hydroxy or amino functional silyl alkoxy with mixing under conditions that exclude moisture to provide the silane functional additive. Typically, a reaction temperature in the range of 150 to 190° F. for a time of 0.5 to 1.0 hours is useful.

Hydroxy or amino functional silyl alkoxy is understood to mean short chain, monomeric compounds that contain a terminal silylalkoxy group and which have a hydroxy or a primary or secondary amino group on at least one additional end. Both the hydroxyl as well as the amino groups therefore possess at least one labile hydrogen atom and are reactive with isocyanate groups on the oligomer. Useful compounds include N-(n-butyl)-3-aminopropyltrimethoxysilane, available as Dynasylan 1189 from Evonik Industries and Silquest A1170 available from Momentive Performance Materials Inc. Silquest A1170 is a bis-silane or a bipodal silane and advantageously provides twice the number of silylalkoxy groups which leads to additional crosslinking of the final composition.

In some embodiments the composition effectively excludes catalyst as a catalyst free composition of this embodiment can have improved physical properties compared to the same composition including a catalyst. However, catalysts can optionally be useful to accelerate reaction of polyether polyol(s) with the polyisocyanates to form the oligomer. Useful catalysts include organotin catalysts such as dioctyltin dilaurate (DOTL), dibutyltin dilaurate (DBTL), etc. The optional catalyst may also include other type of catalysts. Exemplary catalyst includes bismuth compounds; titanium alkoxides; tertiary amines; zirconium complexes; aluminum chelates; and other organometallic compounds based on Zn, Co, Ni, and Fe and the like. Mixtures of catalysts can be used.

The silane functional additive in the uncured state will be a liquid at room temperature.

The weight % of silane functional additive in the curable composition is advantageously from 1-50%, preferably at 10-40%, and more preferably from 15-25% by weight of silane modified polymer in adhesive composition.

The disclosed compositions can optionally comprise one or more moisture scavenger(s). Compounds that react with water to afford groups that are inert towards the reactive groups present in the composition and thereby effect the lowest possible changes in its molecular weight, are suitable as moisture scavengers. In addition, the reactivity of the moisture scavenger towards the moisture that ingressed into the composition must be higher than the reactivity of the end groups of the polymer that carries silyl groups present in the inventive compositions. Some useful moisture scavengers include vinylsilanes, such as vinyltrimethoxysilane, vinyltriethoxysilane, 3-vinylpropyltriethoxysilane; benzamidosilanes, such as bis(n-methylbenzamido)methylethoxysilane; carbamatosilanes, such as carbamatomethyltrimethoxysilane and alkyl trimethoxysilanes, tetramethyl-, tetraethoxy- or ethylethoxysilane. One preferred moisture scavenger is vinyltrimethoxysilane.

If moisture scavenger are added, then they are preferably employed in an amount of up to 20 parts by weight, based on 100 parts by weight of curable composition.

The disclosed compositions can optionally comprise one or more plasticizer(s). A plasticizer is understood to mean a substance that reduces the viscosity of a composition and thereby facilitates the processability and moreover improves the flexibility and elongation behavior of the composition.

The disclosed compositions can optionally comprise one or more reactive diluent(s). The reactive diluent preferably possesses at least one functional group that after the application reacts for example with moisture or atmospheric oxygen. Examples of such groups are silyl groups, isocyanate groups, vinylic unsaturated groups and polyunsaturated systems. As reactive diluents, all compounds that are miscible with and reduce the viscosity of the inventive curable composition, and that carry at least one group that is reactive with the binder can be employed, alone or as a combination of a plurality of compounds. The reactive diluents can be employed in the inventive curable compositions in the same weight fractions as the plasticizer.

The adhesive composition can optionally comprise an adhesion promoter or coupling agent which promotes bonding of the composition to a substrate. Examples are described in: Michel J. Owen, "*Coupling agents: chemical bonding at interfaces*", in Adhesion Science and Engineering-2, Surfaces, Chemistry and Applications, M. Chaudhury and A. V. Pocius eds., Elsevier, New York, 2002, p. 403, incorporated by reference herein. Preferred adhesion promoters include organo-silanes which can link the silane-functional polymer to the surface such as amino silanes and epoxy silanes. Some exemplary aminosilane adhesion promoters include 3-aminopropyltrimethoxysilane, 3-aminopropyltriethoxysilane, N-(2-aminoethyl-3-aminopropyl)trimethoxysilane, 3-aminopropylmethyldiethoxysilane, 4-amino-3,3-dimethylbutyltrimethoxysilane, N-(n-butyl)-3-aminopropyltrimethoxysilane, 1-butanamino-4-(dimethoxymethylsilyl)-2,2-dimethyl, (N-cyclohexylaminomethyl)triethoxysilane, (N-cyclohexylaminomethyl)methyldiethoxysilane, (N-phenylaminoethyl)trimethoxysilane, (N-phenylaminomethyl)methyldimethoxysilane or gamma-ureidopropyltrialkoxysilane. Aminosilanes with oligomeric structures such as Sivo 203 and Dynasylan 1146 from Evonik Corp. Particularly preferred amino silanes include 3-aminopropyltrimethoxysilane, 3-aminopropyltriethoxysilane, and N-Butyl-3-(trimethoxysilyl)propylamine. Some exemplary epoxy silane adhesion promoters include 3-glycidyloxypropyltrimethoxysilane, 3-glycidyloxypropyltriethoxysilane or beta-(3,4-epoxycyclohexyl)ethyltrimethoxysilane. Other silane adhesion promoters include bipodal silanes and mercaptosilanes. Other useful adhesion promoters include bipodal silanes and bipodal mercaptosilanes. Some exemplary bipodal silanes include Silquest A 1170 and Dynasylan 1124. Some exemplary mercaptosilane adhesion promoters include 3-mercaptopropyltrimethoxysilane, 3-mercaptopropylmethyldimethoxysilane or 3-mercaptopropyltriethoxysilane. If used, the level of adhesion promoter employed can be from 0 wt. % to about 20 wt. %, preferably 0.01 wt. % to 10 wt. % and more preferably 0.1 wt. % to 5 wt. %. The adhesion promoter, if more reactive to moisture than the reactive plasticizer, can also serve as a moisture scavenger. Any of the above adhesion promoters can also be used as a crosslinker. For use as a crosslinker the aminosilane should be present in an amount of 0.01 wt. % to 20 wt. %, preferably 0.5 wt. % to 5 wt. %.

No catalyst is needed for effective curing of the composition. However, the curable compositions can optionally comprise one or more catalyst(s) such as silane condensation catalyst or cure or crosslinking catalyst. Some useful crosslinking catalyst(s) are described in U.S. Pat. No. 9,365,751 and incorporated by reference herein. Exemplary catalyst includes bismuth compounds such as bismuth carboxylate; organic tin catalysts such as dioctyltin dilaurate, dimethyltin dineodecanoate, dibutyltin oxide, dibutyltin dilaurate and dibutyltin diacetate; titanium alkoxides (TYZOR® types, available from DuPont); tertiary amines such as bis (2-morpholinoethyl) ether, 2,2'-Dimorpholino Diethyl Ether (DMDEE) and triethylene diamine; zirconium complexes (KAT XC6212, K-KAT XC-A209 available from King Industries, Inc.); aluminum chelates (K-KAT 5218, K-KAT 4205 available from King Industries, Inc.), KR types (available from Kenrich Petrochemical, Inc.); and other organometallic compounds based on Zn, Co, Ni, and Fe and the like. If used, the level of catalyst in the adhesive composition will depend on the type of catalyst used, but can range from about 0 to about 5 wt. %, advantageously from about 0.001 to about 3 wt. % and more advantageously from about 0.005 to about 1.5 wt. %, based on the total weight of the adhesive composition.

The disclosed compositions can optionally comprise one or more additional fillers. Exemplary suitable fillers are chalk, lime powder, precipitated and/or pyrogenic silicas, zeolites, bentonites, magnesium carbonate, diatomaceous earth, alumina, clay, talc, titanium oxide, iron oxide, sand, quartz, flint, mica, hollow microspheres, glass powder and other ground mineral substances as well as carbon black and graphite. Moreover, organic fillers can also be added, especially wood fibers, wood flour, sawdust, cellulose, cotton, pulp, cotton, hogged chips, chopped straw, chaff, other chopped fibers and ground walnut shells. Furthermore, short fibers such as glass fiber, glass filament, polyacrylonitrile, carbon fiber, Kevlar fiber or also polyethylene fibers. Aluminum powder is also a suitable filler. The fillers are preferably added in an amount of 1 to 90 parts by weight, based on 100 parts by weight of curable composition.

For some applications, fillers are preferred that lend thixotropy to the preparations. Fillers of this type are also described as rheological additives or auxiliaries, e.g. silica gels, aerosils, charcoal, carbon black or swellable plastics like PVC. Furthermore, the following organic additives can be employed as rheology modifiers: hydrogenated castor oil, fatty acid amides, urea derivatives and polyurea derivatives.

The curable compositions can optionally comprise one or more UV stabilizer(s) (UV absorber(s)). The amount of the UV stabilizers is preferably up to about 2 parts by weight, based on 100 parts by weight of curable composition. Hindered amine light stabilizers (HALS) are useful as UV stabilizers.

The adhesive composition can optionally comprise conventional additives known to a person skilled in the art. Conventional additives which are compatible with a composition according to this invention may simply be determined by combining a potential additive with the composition and determining if they remain homogenous. Non-limiting examples of useful additives include, without limitation, color pigments, color pastes, defoamers, rheology modifiers, air release agents, fungicides, flame retardants and combinations thereof.

The total level of conventional additives will vary depending on amount of each particular additive needed to provide the silane reactive hot melt adhesive composition with desired properties. The level of additives can be from 0 to 80%.

The curable composition will typically have the following components and concentrations.

| component | range (wt. %) | preferred range (wt. %) |
|---|---|---|
| silane modified polymer (SMP) | 90-10 | 50-20 |
| silane functional additive (SFA) | 1-50 | 5-35 |
| filler | 0-80 | 20-60 |
| moisture scavenger | 0-20 | 1-10 |
| crosslinker | 0.1-20 | 0.5-5 |
| plasticizer | 0-60 | 0-40 |
| reactive diluent | 0-60 | 0-30 |
| Rheology modifier | 0-30 | 1-10 |
| adhesion promoter | 0-20 | 0.1-5 |
| catalyst | 0-5 | 0.005-1.5 |
| UV stabilizer | 0-2 | 0-2 |
| colorant | 0-30 | 0-20 |

The curable adhesive composition can be prepared by mixing the non-reactive components until homogeneously blended. This is followed by mixing the reactive components to the blended non-reactive components. Mixing should be done in a controlled atmosphere to exclude moisture.

The adhesive compositions in the uncured state will be pasty solids.

The adhesive compositions are useful for bonding articles composed of a wide variety of substrates (materials), including but not limited to wood, metal, polymeric plastics, glass, textiles and composites. The adhesive compositions can be used to bond articles together by applying the adhesive composition, typically at room temperature, to a first article substrate; and bringing a second article substrate in contact with the adhesive composition applied to the first article. After application of the second article the adhesive bond can be exposed to conditions suitable to crosslink the composition and cure it to an irreversible solid form. Conditions of 23° C. and 50% humidity for 24 hours are suitable to cure the disclosed composition to an irreversible solid form.

EXAMPLES

Unless otherwise stated, the quantities listed below are understood to be in weight percent based on the total weight of the composition.

Water Miscibility Test:

The test method for polyol miscibility with water is as follows. Into a container charge 50 g of polyol, followed by 50 g of water. Thoroughly mix for 15 min. Let sit for about 24 hours at room temperature. If the mixture after 24 hours is a clear and homogeneous liquid, the polyol is miscible with water. If the mixture is turbid or separates into layers of different phases, the polyol is not miscible with water.

Skin Over Time (SOT).

Skin over time is tested by probing a film as it cures to establish the time at which the film becomes non-tacky.

Tensile Test of Neat Cured Film According to ASTM D-638.

A film of the composition is cast in a template. Skin Over Time (SOT) of the cast film is recorded. The film is cured for 7 days or until fully cured. Dogbone samples are cut according to ASTM D-638 and tested in a tensile testing machine (Sintech 1D). Tensile modulus and Strain % at break for the sample are recorded. The higher the tensile modulus the higher the strength of that cured composition. The higher the Strain % the higher the flexibility and elongation of that cured composition.

Adhesion Test.

An adhesive composition is prepared. The compositions is applied, typically at room temperature, to a first test substrate; and a second test substrate is placed in contact with the adhesive composition applied to the first substrate. After application of the second substrate the adhesive bond is kept under constant temperature (23° C.) and humidity (50%) conditions to cure for 24 hours to an irreversible solid form. The cured bonds are tested by a tensile testing machine, for example by Instron, in lap shear mode at pulling speed of 0.5" per min until failure and the lap shear bond strength are recorded in PSI.

Comparative Composition A

Polypropylene ether polyol (Acclaim 12200, hydroxyl value=9.90) was dried under vacuum. Under a nitrogen atmosphere, 0.1 g of dioctyltin dilaurate (TIB Kat 216) was added with stirring. Then, 15.19 g (68.33 mmol) of IPDI was added (NCO/OH ratio=2.02) with stirring. The mixture was left for one hour at 80-90° C. When the % NCO<0.75, 17.09 g (72.60 mmol) of N-(3-(Trimethoxysilyl)propyl)butylamine (Dynasylan 1189) was added with stirring and the mixture was left for half an hour at 80-90° C. (% NCO=0.00). A linear, gamma-silane terminated polymer was obtained. The polymer was stored in a moisture-proof glass vessel under a nitrogen atmosphere to prevent moisture curing. This is control silane modified polymer SMP A.

Polyol Miscibility Test with Water

Selected polyols were tested for miscibility with water.

|  | Voranol CP 450 | Lupranol 1101-1 | Lupranol 2095 | Adiansol Go2280T | PTHF 1000 | Trimethylol Propane |
|---|---|---|---|---|---|---|
| Miscible with water | No | No | No | Yes | No | Yes |

Example 1

Silane functional additives are made by reacting the isocyanatosilane with the polyol and catalyst shown below at a temperature of about 170° F. for about 60 minutes. Properties are listed below.

|  | comparative 1 | SFA 2 | SFA 3 |
|---|---|---|---|
| isocyanatosilane | 1 | 1 | 1 |
| isocyanatosilane amount | 41 | 41 | 41 |
| polyol | 2 | 3 | 3 |
| polyol structure | PO/EO | EO | EO |
| polyol amount | 70 | 86 | 86 |
| is polyol water miscible | no | yes | yes |
| Catalyst tin[4] | 0.01 | 0.01 | none |
| viscosity (cps@25° C.) | 1410 | 3950 | 2130 |
| physical form 25° C. | liquid | liquid | liquid |

[1] Silquest A-Link 35 available from Momentive Performance Materials, Inc.
[2] Lupranol 1101-1 available from BASF is a propylene oxide (PO) ethylene oxide (EO) mixture with functionality f = 3.
[3] Adiansol GO 2280T available from Arkema has Mw1000, pure ethylene oxide (EO) backbone, with functionality f = 3.
[4] DOTL Lupranol 1101-1 is a trifunctional, copolymer polyol with propylene oxide and ethylene oxide units on its backbone. It is not miscible with water. Adiansol GO 2280T is a trifunctional polyol with ethylene oxide units on it backbone. It is miscible with water.

Moisture curable compositions were made comprising about 80 wt. % control SMP A, about 20 wt. % additive and about 1 wt. % crosslinker (Geniosil GF91 available from Wacker Chemie and about 0.3% wt. % dioctyl tin catalyst. After fully mixing the formulation was cast into a film about 0.02 to 0.12 inches thick and 4 inches by 8 inches in size. Skin Over Time (SOT) of the cast films was tested and the films were cured for 1 week under constant temperature (23C) and humidity (50%) condition. Tensile properties for the cured films was tested. Results are shown in the Table below and FIG. 1.

|  | composition | SOT | Modulus (psi) | Raw Peak Strain (%) |
|---|---|---|---|---|
| A | control silane modified polymer (SMP) | 40 | 188 | 156 |
| comp 1 | 80 wt. % SMP A + 20 wt. % comp 1 | 46 | 266 | 82 |
| 2 | 80 wt. % SMP A + 20 wt. % SFA 2 | 34 | 208 | 185 |
| 3 | 80 wt. % SMP A + 20 wt. % SFA 3 | 47 | 240 | 190 |

Comparative composition 1 comprising both control SMP A and silane functional additive based on a mixed propylene oxide (PO) ethylene oxide (EO) polyol acted as expected, having increased strength at the expense of reduced flexibility over composition A comprising just the silane modified polymer.

Surprisingly, compositions 2 and 3 including additives SFA2 and SFA3 respectively and comprising both control SMP A and silane functional additive based on water miscible, ethylene oxide (EO) polyol had both increased strength and increased flexibility over composition A comprising just the silane modified polymer. While not wishing to be bound by any theory, this surprising result may be the effect of using polyols with no pendant groups in the backbone, which allows for formation of small, organized semi-crystalline domain during cure. Meanwhile, the water miscibility attracts more moisture which allows for more complete crosslinking reaction during cure. Both factors may lead to increased strength and flexibility of final cure formulation.

Also surprising is the fact that composition 3, made without tin catalyst gives better enhancement than composition 2, made with tin catalyst. This is added advantage because organotin can be a cause for concern in some applications.

Overall, moisture curable composition 3 (80% control SMP A and 20% silane functional additive (SFA) 3 with a water miscible ethylene oxide backbone) gave the best improvement in both Modulus and Raw Peak Strain (%) in comparison to a 100% control composition.

Example 2

Moisture curable compositions comprising a physical blend of control SMP A, different amounts of SFA 3 silane functional additive (10 wt. %, 20 wt. %, 30 wt. % and 40 wt. %) and about 1 wt. % crosslinker (Geniosil GF91 available from Wacker Chemie and about 0.3% wt. % dioctyl tin catalyst. were prepared and made into films as described above. Skin Over Time and Tensile properties were tested as described above. Results are shown in the Table below and FIG. 3.

| | composition | SOT | Modulus (psi) | Raw Peak Strain (%) |
|---|---|---|---|---|
| A | control silane modified polymer SMP | 40 | 188 | 156 |
| 3a | 90 wt. % SMP A + 10 wt. % SFA 3 | 45 | 205.6 | 183 |
| 3b | 80 wt. % SMP A + 20 wt. % SFA 3 | 47 | 240 | 190 |
| 3c | 70 wt. % SMP A + 30 wt. % SFA 3 | 45 | 302.7 | 104 |
| 3d | 60 wt. % SMP A + 40 wt. % SFA 3 | 47 | 456 | 24 |

As the amount of silane functional additive in the composition increases the modulus increases. For applications where strength is desired and flexibility is less or not important compositions comprising any amount of silane functional additive, for example 0.1% to 50% are useful.

Surprisingly, cured reaction products of compositions comprising both control SMP A and up to about 25% silane functional additive 3 with a water miscible ethylene oxide backbone had both increased strength and increased flexibility over cured reaction products of composition A comprising just the control SMP A without the silane functional additive. For applications where strength and flexibility are desired compositions comprising up to about 25% silane functional additive, for example 0.1% to 25% are useful. Composition 3b, comprising 20% silane functional additive and 80% control SMP A, provides a balanced improvement in both strength and flexibility as compared to the 100% silane modified polymer composition.

Comparative Example 3

Comparative additives are made by reacting the isocyanatosilane with the polyol and catalyst shown below at a temperature of about 170° F. for about 60 minutes. Properties are listed below.

| | comp 4 | comp 5 | comp 6 | comp 7 |
|---|---|---|---|---|
| isocyanatosilane | 1 | 1 | 1 | 1 |
| isocyanatosilane amount (gms) | 41 | 30.75 | 41 | 30.75 |
| polyol | 2 | 3 | 4 | 5 |
| polyol amount (gms) | 16.94 | 21.9 | 46.6 | 217.95 |
| Is polyol water miscible? | no | no | no | no |
| Catalyst DOTL | 0.005 | 0.005 | 0.01 | 0.01 |
| physical form 25° C. | liquid | liquid | liquid | liquid |

1 Silquest A-Link 35 available from Momentive Performance Materials, Inc.
2 Voranol CP 260 available from the Dow Chemical Company.
3 Voranol CP 450 available from the Dow Chemical Company.
4 Voranol CP 755 available from the Dow Chemical Company.
5 Lupranol 2095 from BASF Voranol CP260, CP 450 and CP 755 are indicated to be glycerine-propoxylated polyether triols having a functionality of 3. Lupranol 2095 is indicated to be a propylene oxide (PO) ethylene oxide (EO) mixture having a functionality of 3. All of these polyols were not water miscible.

Four comparative moisture curable compositions comprising a physical blend of 90 wt. % control SMP A, 10 wt. % each of comparative additives 4-7, about 1 wt. % crosslinker (Geniosil GF91 available from Wacker Chemie and about 0.3% wt. % dioctyl tin catalyst were prepared and made into films as described above. Skin Over Time and Tensile properties were tested as described above. Results are shown in the Table below and FIG. 4.

| | composition | SOT | Modulus (psi) | Raw Peak Strain (%) |
|---|---|---|---|---|
| A | control silane modified polymer SMP | 40 | 188 | 156 |
| comp 4 | 90 wt. % SMP A + 10 wt. % comp 4 | 39 | 224 | 138 |
| comp 5 | 90 wt. % SMP A + 10 wt. % comp 5 | 33 | 235 | 113 |
| comp 6 | 90 wt. % SMP A + 10 wt. % comp 6 | 29 | 223 | 96 |
| comp 7 | 90 wt. % SMP A + 10 wt. % comp 7 | 30 | 199 | 117 |

Comparative compositions 4-7, comprising silane functional additives 4-7 respectively, improve strength compared to the control (100 wt. % control SMP A) composition but, as is conventional, have a lower elongation compared to the control composition. The propoxylated backbones in comparative compositions 4-7 with their pendant groups and/or lack of water miscibility do not provide the surprising combination of improved strength and improved flexibility obtained by using a silane functional additive with a water miscible ethylene oxide backbone.

Additives comprising three OH moieties (functionality of 3) but with a pendant group in backbone and poor water miscibility such as additives 4-7 do not provide the surprising combination of improved strength and improved flexibility.

Comparative Example 4

Comparative additives are made by reacting the isocyanatosilane with the polyol and catalyst shown below at a temperature of about 170° F. for about 60 minutes. Properties are listed below.

|  | comp 8 | comp 9 |
|---|---|---|
| isocyanatosilane | 1 | 1 |
| isocyanatosilane amount | 41 | 41 |
| polyol | 8 | 9 |
| polyol amount | 6.1 | 8.9 |
| Is polyol water miscible? | yes | yes |
| catalyst DOTL | 0.01 | 0.01 |

1 Silquest A-Link 35 available from Momentive Performance Materials, Inc.
8 glycerol.
9 trimethylolpropane (TMP).

Moisture curable comparative compositions comprising a physical blend of 80 wt. % control SMP A, 20 wt. % each of comparative additives 8-9, about 1 wt. % crosslinker (Geniosil GF91 available from Wacker Chemie and about 0.3% wt. % dioctyl tin catalyst were prepared and made into films as described above. Tensile properties and Skin Over Time was tested as described above. Results are shown in the Table below and FIG. 5.

|  | composition | SOT | Modulus (psi) | Raw Peak Strain (%) |
|---|---|---|---|---|
| A | control silane modified polymer SMP | 40 | 188 | 156 |
| comp 8 | 80 wt. % SMP A + 20 wt. % comp 8 | 54 | 222 | 144 |
| comp 9 | 80 wt. % SMP A + 20 wt. % comp 9 | 50 | 304 | 99 |

Comparative composition 8 comprising additive 8 improves strength compared to the control composition A (100 wt. % SMP A) but has a very slightly lower elongation compared to the 100 wt. % control SMP A composition. Comparative composition 9 comprising additive 9 improves strength significantly compared to the 100 wt. % control SMP A composition but has a lower elongation compared to the 100 wt. % control SMP A composition.

Additives comprising three OH moieties (functionality of 3) but without a water miscible ethylene oxide backbone such as additives 8 and 9 do not provide the surprising combination of improved strength and improved flexibility obtained by using a silane functional additive with a water miscible ethylene oxide backbone.

Example 5

Additives are made by reacting the isocyanatosilane with the polyol and catalyst shown below at a temperature of about 170° F. for about 60 minutes. Properties are listed below.

|  | SFA 11 |
|---|---|
| isocyanatosilane | 1 |
| isocyanatosilane amount | 41 |
| polyol | 2 |
| polyol amount | 18.66 |
| Is polyol water miscible? | not miscible |
| catalyst DOTL | 0 |
| viscosity (cps@25° C. | 1370 |

1 Silquest A-Link 35 available from Momentive Performance Materials, Inc.
2 Adiansol DA240 available from Arkema.

Adiansol DA 240 is described as an amine based polyether triol containing primary hydroxyl groups and having a linear PEG backbone with functionality 3 and a tertiary amine N in the backbone. It has a molecular weight (MVV) of 280.

A moisture curable composition comprising a physical blend of 80 wt. % control SMP A, 20 wt. % additive 11, about 1 wt. % crosslinker (Geniosil GF91 available from Wacker Chemie and about 0.3% wt. % dioctyl tin catalyst was prepared and made into a film as described above. Tensile properties and Skin Over Time was tested as described above. Results are shown in the Table below.

|  | composition | SOT | Modulus (psi) | Raw Peak Strain (%) |
|---|---|---|---|---|
| A | control silane modified polymer SMP A | 56 | 164 | 139 |
| 11 | 80 wt. % SMP A + 20 wt. % SFA 11 | 55-65 | 236 | 202 |

Surprisingly, composition 11, comprising 20 wt. % of additive 11 and 80 wt. % of control SMP A, significantly increased both strength (modulus) elongation (strain) compared to the 100 wt. % control composition. For applications where strength and flexibility are desired compositions comprising up to about 50%, preferably up to about 25%, silane functional additive 11 are useful.

Example 6

Additives are made by reacting the isocyanatosilane with the polyol and catalyst shown below at a temperature of about 170° F. for about 60 minutes. Properties are listed below.

|  | SFA 14 |
|---|---|
| isocyanatosilane | 1 |
| isocyanatosilane amount | 102.5 |
| polyol | 2 |
| polyol amount | 255 |
| Is polyol water miscible? | no |
| catalyst DOTL | 0.035 |
| viscosity (cps@25° C. | 947.5 |

1 Silquest A-Link 35 available from Momentive Performance Materials, Inc.
2 PolyTHF 1000 available from BASF. PolyTHF 1000 is described as a difunctional, linear, saturated polyetherol derived from the polymerization of tetrahydrofuran. It has a molecular weight (MW) of 1000.

Silane functional additive 14 turned turbid after 14 days storage at room temperature with moisture excluded.

A moisture curable composition comprising a physical blend of 80 wt. % control SMP A, 20 wt. % additive 14, about 1 wt. % crosslinker (Geniosil GF91 available from Wacker Chemie and about 0.3% wt. % dioctyl tin catalyst was prepared and made into a film as described above.

Tensile properties and Skin Over Time was tested as described above. Results are shown in the Table below.

| | composition | SOT | Modulus (psi) | Raw Peak Strain (%) |
|---|---|---|---|---|
| A | control silane modified polymer SMP | 56 | 164 | 139 |
| 14 | 80 wt. % SMP A + 20 wt. % SFA 14 | 32 | 213 | 171 |

Surprisingly, composition 14, comprising 20 wt. % of additive 14 and 80 wt. % of control SMP A, significantly increased strength (modulus) and increased elongation (strain) compared to the control composition (100 wt. % SMP A). For applications where strength and flexibility are desired compositions comprising silane functional additive 14 are useful.

What is claimed is:

1. A moisture curable composition comprising a physical blend of:
a moisture curable, silane modified polymer of structure (I)

$$B(-A_n-R-SiXYZ)_I \quad (I).$$

wherein B is an organic polymer backbone and B will not be a siloxane backbone,
A is a divalent linking group linking the polymer backbone to the $R^1$ group,
I is an integer from 1 to 6,
n is 0 or 1,
R is a divalent $C_1$-$C_{12}$ hydrocarbon group that optionally comprises a heteroatom,
at least one of X, Y and Z is a hydrolysable group;
a moisture curable, silane functional additive having 3 or more —SiXYZ groups, wherein X, Y and Z are each independently selected from the group consisting of hydrogen, $C_1$-$C_8$ alkyl group, $C_1$-$C_8$ alkoxy group, wherein at least one of the substituents X, Y, Z must be a hydrolyzable group, the silane functional additive being the reaction product of a mixture comprising an isocyanotosilane and a polyol selected from a polyol having a linear ethylene oxide backbone free of nitrogen atoms and a functionality of 3 to 4, a polyol having a linear tetramethylene oxide backbone free of nitrogen atoms and a functionality of 3 to 4, and combinations thereof, wherein the polyol is free of propylene oxide; and
a crosslinker different from the silane modified polymer and the silane functional additive;
wherein cured reaction products of the moisture curable composition have greater strength and greater elongation compared to the moisture curable composition without the moisture curable, silane functional additive.

2. The moisture curable composition of claim 1 wherein B is selected from polyurethane, polyether or polycarbonate.

3. The moisture curable composition of claim 1 wherein the polyol is water miscible.

4. The moisture curable composition of claim 1 wherein A is selected from amide, carbamate, urea, allophanate, biuret, isocyanurate, imino, carboxylate, carbamoyl, amidino, carbonate, sulfonate or sulfinate group or an oxygen or nitrogen atom.

5. The moisture curable composition of claim 1 comprising 20% to 50% silane modified polymer by weight of composition and 10% to 30% of silane functional additive by weight of composition.

6. The moisture curable composition of claim 1 wherein X, Y and Z are each independently selected from H, $C_1$-$C_8$ alkyl group, $C_1$-$C_8$ alkoxy group or $C_1$-$C_8$ acyloxy group, with the proviso that at least one of the groups X, Y, Z must be the alkoxy group or the acryloxy group.

7. The moisture curable composition of claim 1 wherein the cured reaction product has the silane functional additive covalently bonded to the silane modified polymer in the form of a crosslinked network.

8. The moisture curable composition of claim 1 wherein the silane functional additive is the reaction product of the isocyanotosilane and the polyol has a linear ethylene oxide backbone and a functionality of about 3.

9. The moisture curable composition of claim 1 wherein the polyol is selected from a polyol having a linear ethylene oxide backbone and a functionality of about 3, the polyol comprising three, linear ethylene oxide portions with each ethylene oxide portion having a terminal OH moiety.

10. The moisture curable composition of claim 1 being substantially free of tin or other metal catalyst.

11. Cured reaction products of the curable composition of claim 1.

12. An article having a surface and comprising cured reaction products of the curable composition of claim 1 bonded to the surface.

13. The moisture curable composition of claim 1 wherein the polyol used to prepare the silane functional additive reaction product is selected from a triol comprising three separate ethylene oxide portions each terminated by a hydroxyl group, trimethylolpropane ethoxylate, glycerol ethoxylate and combinations thereof.

14. The moisture curable composition of claim 1 wherein the polyol used to prepare the silane functional additive reaction product comprises polytetramethylene oxide units.

* * * * *

UNITED STATES PATENT AND TRADEMARK OFFICE
CERTIFICATE OF CORRECTION

PATENT NO. : 11,692,060 B2
APPLICATION NO. : 16/663478
DATED : July 4, 2023
INVENTOR(S) : Wu Suen et al.

It is certified that error appears in the above-identified patent and that said Letters Patent is hereby corrected as shown below:

In the Specification

Column 9, Line 64 change "(MVV)" to --(MW)--.
Column 20, Line 15 change "(MVV)" to --(MW)--.

Signed and Sealed this
Thirteenth Day of August, 2024

Katherine Kelly Vidal
*Director of the United States Patent and Trademark Office*